US011832336B2

(12) United States Patent
Agarwal et al.

(10) Patent No.: US 11,832,336 B2
(45) Date of Patent: Nov. 28, 2023

(54) CDRX AND IDRX COLLISIONS

(71) Applicant: QUALCOMM Incorporated, San Diego, CA (US)

(72) Inventors: Surbhi Agarwal, Aligarh (IN); Avinash Kumar Dubey, Hyderabad (IN); Balaji Kannan, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 83 days.

(21) Appl. No.: 17/450,951

(22) Filed: Oct. 14, 2021

(65) Prior Publication Data
US 2023/0119395 A1  Apr. 20, 2023

(51) Int. Cl.
*H04W 56/00* (2009.01)
*H04W 76/28* (2018.01)
*H04W 76/30* (2018.01)

(52) U.S. Cl.
CPC ......... *H04W 76/28* (2018.02); *H04W 56/001* (2013.01); *H04W 56/0045* (2013.01); *H04W 76/30* (2018.02)

(58) Field of Classification Search
CPC ............... H04W 76/28; H04W 56/001; H04W 56/0045; H04W 76/30
See application file for complete search history.

(56) References Cited

U.S. PATENT DOCUMENTS

| 2018/0027559 | A1* | 1/2018 | Iyer | H04L 5/0058 |
| | | | | 370/329 |
| 2019/0297577 | A1* | 9/2019 | Lin | H04W 52/0235 |
| 2020/0305097 | A1* | 9/2020 | Bergquist | H04W 76/28 |

FOREIGN PATENT DOCUMENTS

| CN | 110493855 B | * | 1/2023 | ........ H04W 52/0248 |
| TW | 201701634 A | * | 1/2017 | ............ H04W 56/00 |

* cited by examiner

*Primary Examiner* — Lakeram Jangbahadur
(74) *Attorney, Agent, or Firm* — Procopio, Cory, Hargreaves & Savitch LLP/Qualcomm Incorporated

(57) ABSTRACT

Methods, apparatuses, and computer-readable storage medium for resolving state mismatch between a dual subscriber identity module (SIM) dual standby (DSDS)UE and a network are provided. An example method may include receiving, from at least one base station, a connected mode discontinuous reception (DRX) (CDRX) configuration and an idle DRX (IDRX) configuration, the CDRX configuration being associated with a first subscriber and the IDRX configuration being associated with a second subscriber. The example method may further include transmitting, to an upper layer, a radio resource control (RRC) release request based on the CDRX configuration and the IDRX configuration. The example method may further include transmitting, to an associated base station of the at least one base station, a synchronization message to get in synchronization with the associated base station.

26 Claims, 9 Drawing Sheets

CDRX AND IDRX COLLISIONS

TECHNICAL FIELD

The present disclosure relates generally to communication systems, and more particularly, to wireless communication systems with dual subscriber identity module (SIM) dual standby (DSDS) user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a UE are provided. The apparatus may include a memory and at least one processor coupled to the memory. The memory and the at least one processor coupled to the memory may be configured to receive, from at least one base station, a connected mode discontinuous reception (DRX) (CDRX) configuration and an idle DRX (IDRX) configuration, the CDRX configuration being associated with a first subscriber and the IDRX configuration being associated with a second subscriber. The memory and the at least one processor coupled to the memory may be further configured to transmit, to an upper layer, a radio resource control (RRC) release request based on the CDRX configuration and the IDRX configuration. The memory and the at least one processor coupled to the memory may be further configured to transmit, to an associated base station of the at least one base station, a synchronization message to get in synchronization with the associated base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
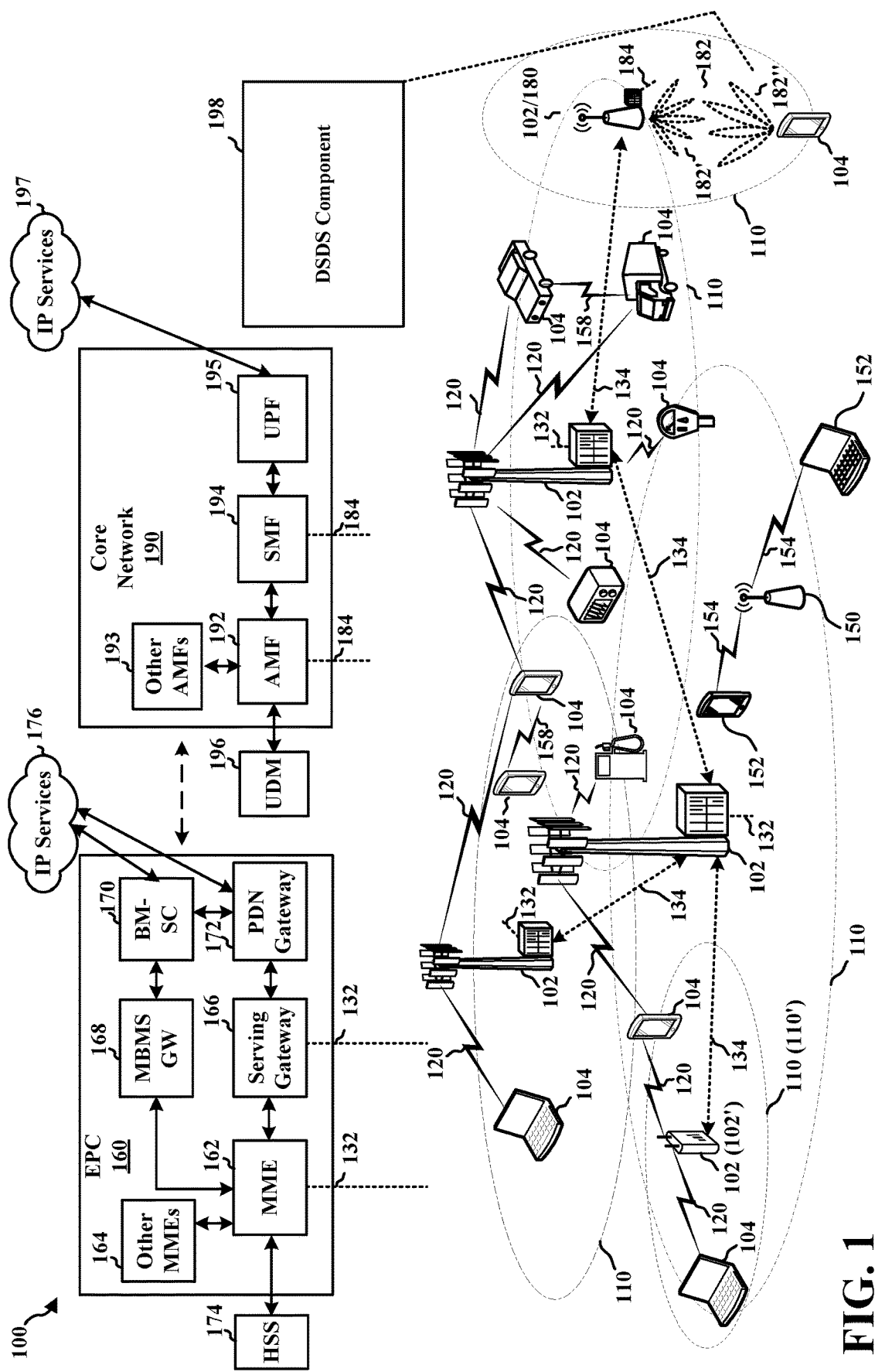
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a DSDS component 198. In some aspects, the DSDS component 198 may be configured to receive, from at least one base station, a CDRX configuration and an IDRX configuration. The CDRX configuration may be associated with a first subscriber and the IDRX configuration may be associated with a second subscriber.

In some aspects, the DSDS component 198 may be further configured to transmit, to an upper layer, an RRC release request based on the CDRX configuration and the IDRX configuration. In some aspects, the DSDS component 198 may be further configured to transmit, to an associated base station of the at least one base station, a synchronization message to get in synchronization with the associated base station.

Although the following description may be focused on 5G NR, the concepts described herein may be applicable to other similar areas, such as LTE, LTE-A, CDMA, GSM, and other wireless technologies.

Figure 2:
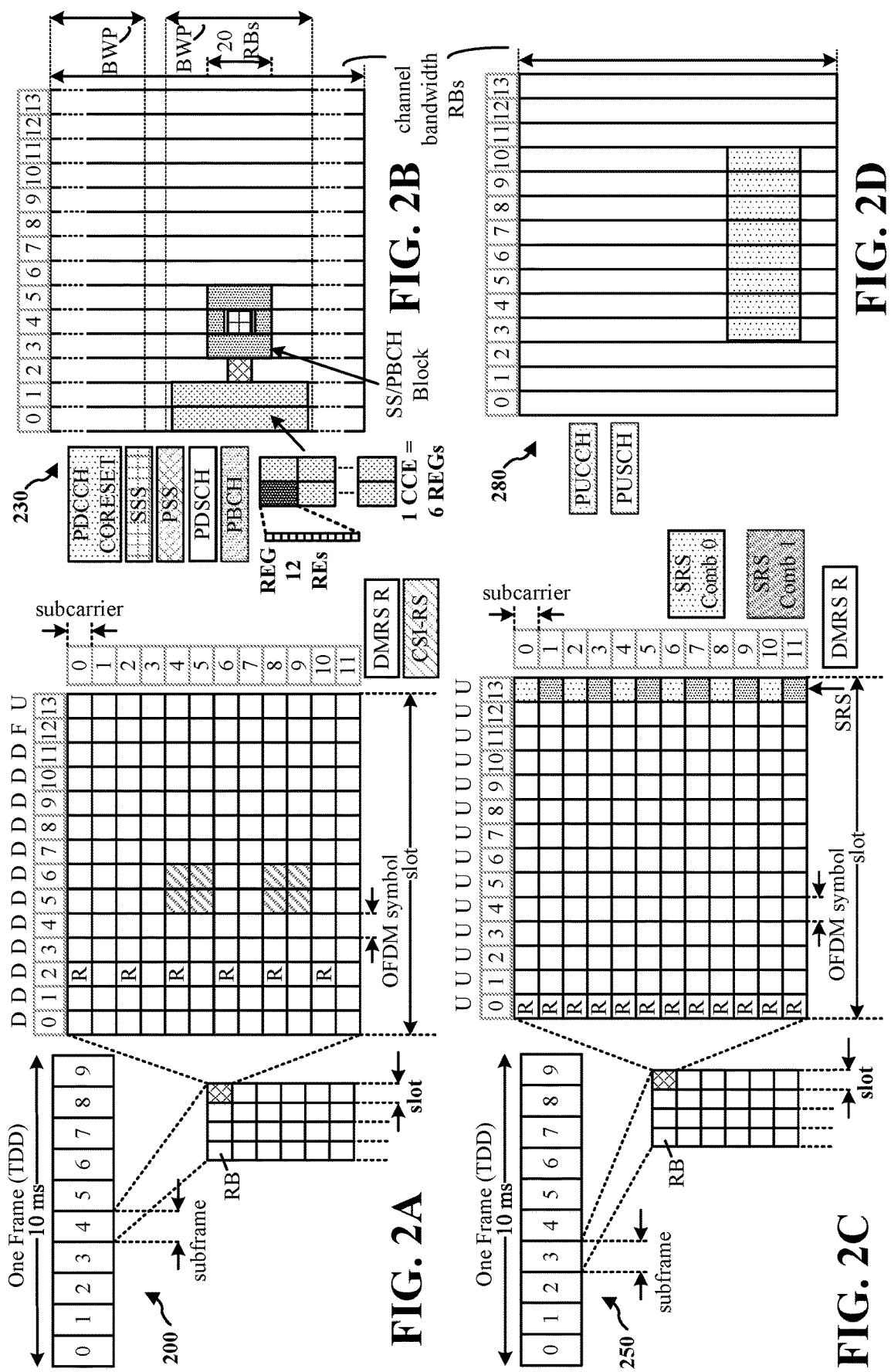
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe.

The subcarrier spacing may be equal to $2^\mu *15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
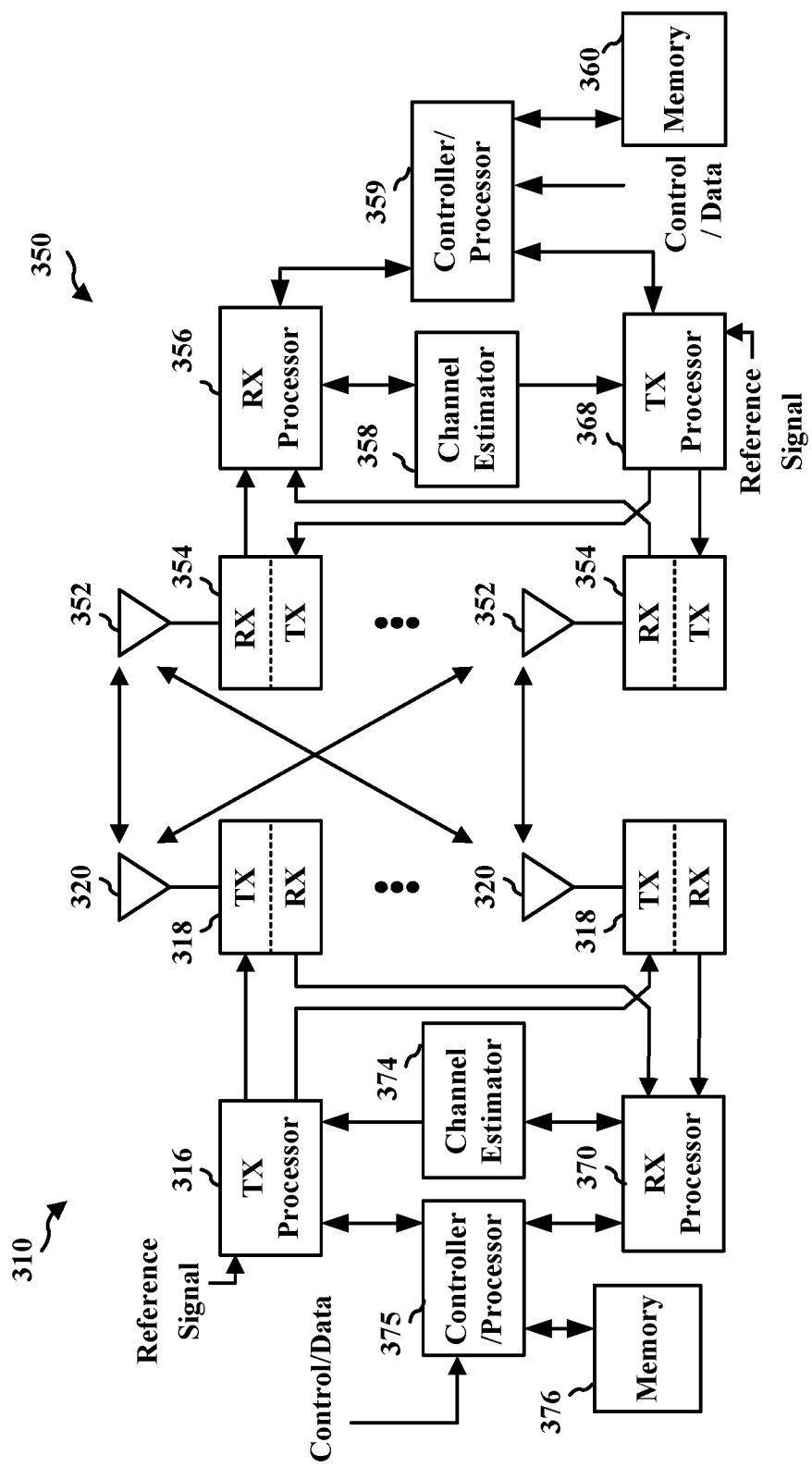
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the DSDS component 198 of FIG. 1.

In some aspects of wireless communications, DSDS UEs, such as DSDS smartphones, may be able to use two SIM cards and keep both SIM cards active at the same time. For example, a DSDS smartphone may use two SIM cards issued by two different network operators and associated with different subscribers. The two SIM cards may be in idle mode at the same, in connected mode at the same time, or one SIM card may be in an idle mode and the other SIM card may be in an RRC connected mode. A UE's SIM card may be "camped on" or "associated with" a base station at any given time. The UE may communicate with a base station where one or more SIM cards of the UE may be associated with a same base station or different base stations. As one example, the two SIM cards of the DSDS UE may be associated with different base stations if the two SIM cards are issued by two different network operators. As another example, the two SIM cards of the DSDS UE may be associated with a same base station if the two SIM cards are issued by a same network operator. As yet another example, the two SIM cards of the DSDS UE may be associated with a same base station if the two SIM cards are issued by two different network operators with infrastructure sharing.

A UE may be configured by a base station for DRX. During an RRC connected state, when there is no data transmission in either direction (UL/DL), the UE may operate using the DRX mode. In the DRX mode, the UE may start monitoring the PDCCH channel discontinuously using a sleep and wake cycle. When the UE is in an RRC connected state, the DRX may also be referred to as CDRX. When the UE is in an idle mode, the DRX may be referred to as IDRX. A UE may use DRX to conserve battery power at the UE. In a non-DRX mode, the UE may monitor for a PDCCH in each subframe to check whether there is downlink data available. Such continuous monitoring of the PDCCH may drain the UE's battery power.

Figure 4:
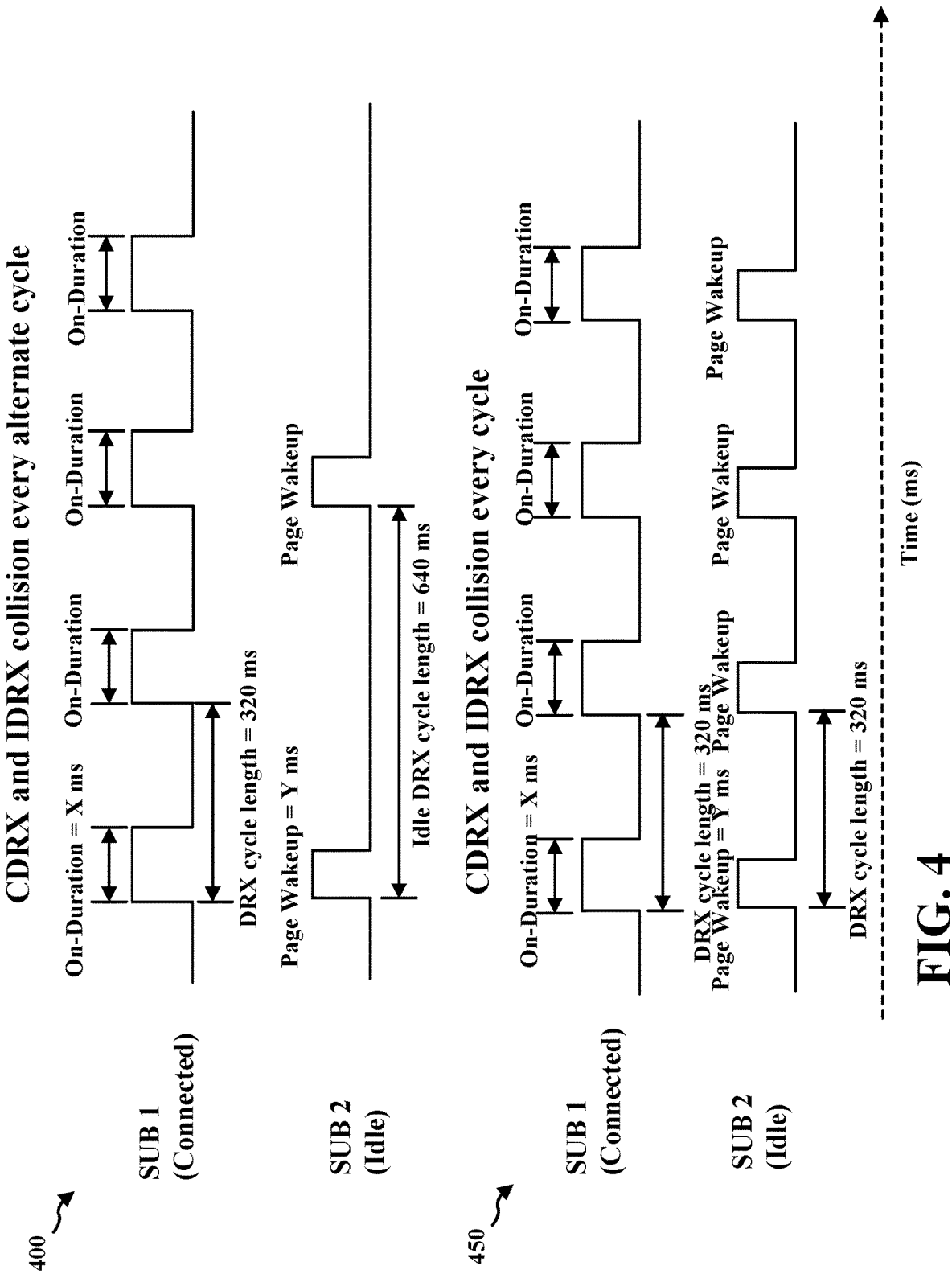
FIG. 4 is a diagram illustrating example CDRX and IDRX collisions.

The UE's DRX configuration may be configured by the network using RRC signaling from a base station, such as in an RRC connection setup request or an RRC connection reconfiguration request. A DRX configuration may include the configuration of one or more timers and values. In some examples, the DRX configuration may include any of an ON duration timer, a DRX inactivity timer, a DRX retransmission timer, a DRX UL retransmission timer, a long DRX cycle, a value of the DRX start offset, a DRX short cycle timer, and/or a short DRX cycle, among others. A DRX cycle may include a periodic repetition of an ON duration in which the UE monitors for a PDCCH from the base station and an OFF duration. FIG. 4 illustrates an example 400 of a DRX cycle including periodic ON durations during which the UE monitors for a PDCCH and OFF durations during which the UE may not monitor for the PDCCH. The OFF duration may be referred to as a DRX opportunity. During the OFF duration, the UE may not monitor for the PDCCH. The UE may enter a sleep mode or a low power mode in which the UE minimizes power consumption by shutting down a radio frequency (RF) function without detecting communication from the base station.

The ON duration timer may correspond to a number of consecutive PDCCH subframes to be monitored or decoded when the UE wakes up from the OFF duration in the DRX Cycle. The DRX retransmission timer may correspond to a consecutive number of PDCCH subframes for the UE to monitor when a retransmission is expected by the UE. The DRX inactivity timer may correspond to an amount of time before the UE may again enter the OFF duration following successfully decoding the PDCCH. The amount of time may be in terms of a transmission time interval (TTI) duration. After a UE successfully receives downlink data, the DRX inactivity timer may start counting a number of subframes. If uplink or downlink data transmissions occur while the DRX inactivity timer is running, the timer restarts. If the DRX inactivity timer expires without uplink or downlink activity, the UE may enter the DRX cycle to achieve power savings. The UE may start with a short DRX cycle. The DRX short cycle may correspond to a first DRX cycle into which the UE enters after successful expiration of a DRX inactivity timer. For IDRX, the UE may periodically wake up to receive paging from a base station. For example, a network may broadcast paging messages periodically in the cell to convey an indication about an incoming call to the UE in IDRX mode. The paging message may be associated with a UE ID of the UE.

The amount of power saving achieved by DRX may be improved based on the specific DRX configuration used. An example DRX configuration may be encoded based on Abstract Syntax Notation One (ASN1) and may include a long cycle time, an inactivity timer, a short cycle time, a short cycle timer, or the like. In some aspects, the DRX configuration may include any of an ON duration timer, a DRX inactivity timer, a DRX retransmission timer, a DRX UL retransmission timer, a long DRX cycle, a value of the DRX start offset, a DRX short cycle timer, a short DRX cycle, or the like.

For a DSDS UE, the two SIM cards may each be associated with a different DRX configuration. For example, a first SIM card associated with a first operator may be configured with a first DRX configuration and a second SIM card associated with a second operator may be configured with a second DRX configuration. In another example, even if the two SIM cards are associated with a same operator, the two SIM cards may still be configured with a different DRX configuration. If one SIM card is in a connected mode and the other SIM card is in idle mode, the SIM card in connected mode may be configured with a CDRX configuration and the SIM card in idle mode may be configured with an IDRX configuration. There may be a chance that an ON duration of the CDRX configuration collides with a paging occasion of the IDRX duration. Both the paging occasion and the ON duration may be periodic. Therefore, a collision that occurs once may consistently occur in subsequent periods.

For example, FIG. 4 is a diagram illustrating example 400 of CDRX and IDRX collisions and example 450 of CDRX and IDRX collisions. As illustrated in example 400, for a DSDS UE, a first subscriber associated with a first SIM may be configured by a CDRX configuration to have a DRX cycle length of 320 ms while a second subscriber associated with a second SIM may configured by an IDRX configuration to have an IDRX cycle length of 640 ms. The start time for both the CDRX and the IDRX may be the same because the two SIM cards are associated with the same UE. In such an instance, despite the ON duration of the CDRX and the wake up duration of the IDRX being different, the wake up duration may still collide with the ON duration for every cycle of the IDRX. The ON duration of the first SIM may collide with the wake up duration of the second SIM every alternate cycle. Such collisions may negatively impact the communication of the UE because paging or other communications may not be received during the collided cycles.

In another example 450, the first subscriber associated with a first SIM may be configured by a CDRX configuration to have a DRX cycle length of 320 ms while the second subscriber associated with a second SIM may configured by an IDRX configuration to have an IDRX cycle length of 320 ms. In such an example, there may be collisions every cycle of the CDRX and the IDRX, and the UE may not be able to receive communication in these collided cycles.

As another example, if a common multiple exists between the first DRX cycle length associated with the CDRX configuration of the first SIM and the second DRX cycle length associated with the IDRX configuration of the second SIM, a collision may occur. For example, if the first DRX cycle length associated with the CDRX configuration of the first SIM is 320 ms and the second DRX cycle length associated with the IDRX configuration of the second SIM is 512 ms, a collision may still happen at the common multiple time 2560 ms, and any multiples of 2560 ms. Therefore, a collision may happen every 2560 ms. Because the CDRX configuration and the IDRX configuration may be configured by different entities, such configurations that cause a collision may be configured. The CDRX configuration or the IDRX configuration alone may be suitable configurations, but configured together on a DSDS UE, collision issues may occur.

For such collisions, if paging in IDRX is configured with a higher priority than communications in the ON duration of CDRX, communications in the ON duration of CDRX may not be received. If paging in IDRX is configured with a lower priority than communications in the ON duration of CDRX, paging in DRX may not be received. Either way, the UE may suffer from the collision. In some cases, missing the DRX wake up may also result in missing an RRC Release from the network, which may create an RRC state mismatch between the network and the UE, and result in missing call notifications, additional consumption of battery power to resolve the RRC state mismatch, or other unwanted consequences. Aspects provided herein provide mechanisms for resolving such collisions between different DRX configurations on different SIMS for dual-SIM UEs. By resolving such collisions, aspects provided herein may be used to improve voice call communication performance, improve reliability of DL or UL grant reception, reduce power consumption, and improve overall communication quality.

Figure 5:
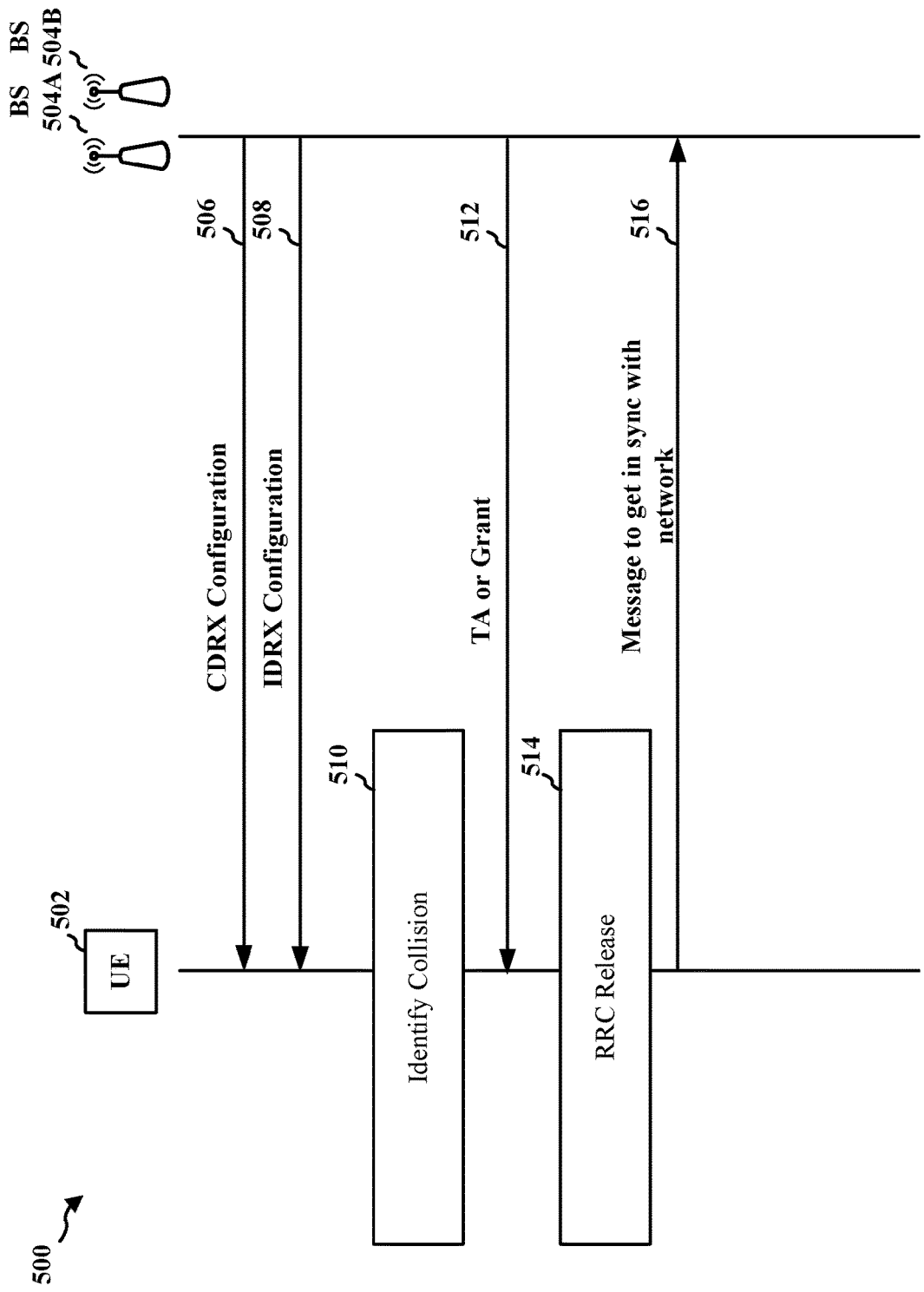
FIG. 5 is a diagram illustrating communication flow between a UE and one or more base stations.

FIG. 5 is a diagram 500 illustrating communication flow between a UE 502 and one or more base stations 504A and 504B. For example, the base station 504A may be a first base station associated with a first SIM of the UE 502 and the base station 504B may be a second base station associated with a second SIM of the UE 502. In some aspects, the one or more base stations 504A and 504B may be one base station and both SIMs of the UE may be associated with the base station. As illustrated in FIG. 5, one of the one or more base stations 504A and 504B, such as the base station 504A, may transmit a CDRX configuration 506 to the UE 502. The UE 502 may accordingly enter a CDRX associated with a first SIM of the UE based on the CDRX configuration 506. The CDRX configuration 506 may define a cycle length of X ms, where X is a number. One of the one or more base stations 504A and 504B, such as the base station 504B, may transmit an IDRX configuration 508 to the UE 502. The UE 502 may accordingly enter an IDRX associated with a second SIM of the UE based on the IDRX configuration 508. The IDRX configuration 508 may define a cycle length of Y ms, where Y is a number. If there is a common multiple Z between X and Y, collisions between CDRX of the first SIM and IDRX of the second SIM may happen every Z ms. For example, if X is 80 and Y is 240, collisions between CDRX of the first SIM and IDRX of the second SIM may occur every 240 ms. If X is 512 and Y is 320, collisions between CDRX of the first SIM and IDRX of the second SIM may occur every 2560 ms.

The UE may identify the collisions at 510 based on the CDRX configuration 506 and the IDRX configuration 508. In some aspects, after identifying the collisions, the UE 502 may handle the collisions based on a mechanism, such as the mechanism described in connection with FIG. 6. In some aspects, based on identifying the collisions at 510, the UE 502 may transmit an RRC release associated with the RRC release request to one or more upper layers of the UE once the countdown timer reaches zero at 514. For example, the UE 502 may locally transmit an RRC release request to an upper layer of the UE 502 and perform an RRC release accordingly. In some aspects, the UE may receive a timing adjustment (TA) or grant 512 from the base station 504A/504B, and may accordingly adjust whether to perform the RRC release at 514. For example, UE 502 may temporarily refrain from performing the RRC release at 514 based on a mechanism, such as the mechanism described in connection with FIG. 6.

If the UE 502 performs the RRC release at 514, the UE 502 may transmit a message 516 to the associated base station(s) of the UE 502, such as the base stations 504A/504B, to synchronize with the associated base station. The message 516 may be any message for getting in synchronization with the network associated with the associated base station(s). As used herein, the term "synchronization message" may refer to any message for getting in synchronization with the network, such as a RRC message, a non-access stratum (NAS) message, or a tracking area update (TAU), or any other message for getting in synchronization with the network. For example, the UE 502 may transmit the message 516 to the base station 504A associated with the first SIM of the UE 502. In another example, the UE 502 may transmit the message to the base station 504B associated with the second SIM of the UE 502. As another example, the UE 502 may transmit the message 516 to the base station 504A associated with the first SIM of the UE 502 and transmit the TAU 516 to the base station 504B associated with the second SIM of the UE 502.

Figure 6:
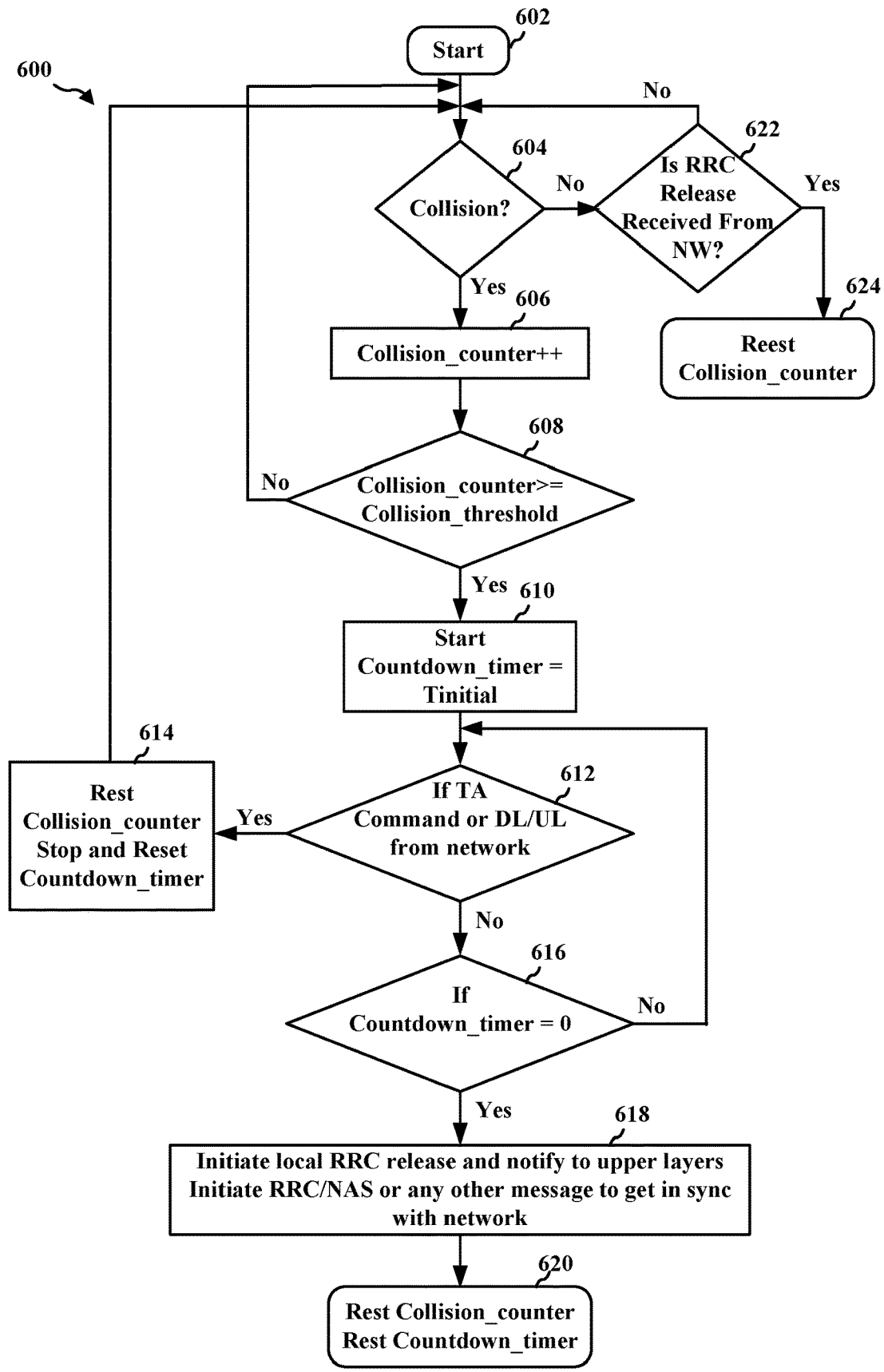
FIG. 6 is a diagram illustrating example UE operations.

FIG. 6 is a diagram 600 illustrating example UE operations for an RRC release associated with each SIM of the UE. Starting at 602, the UE may receive the CDRX configuration and the IDRX configuration. Based on the CDRX configuration and the IDRX configuration, the UE may identify whether there is a collision at 604. For example, the UE may identify whether there is a collision within a period of time. If there is no collision, the UE may identify whether an RRC release is received from the network at 622. If the RRC release is received from the network, the UE may reset a collision counter at 624. If the RRC release is not received, the UE may re-identify collisions at another time. If there is a collision, for each collision within the period of time, the UE may increment a collision counter at 606. If the collision counter is above a collision counter threshold at 608, the UE may start a countdown timer based on an initial time at 610. For example, if the CDRX configuration configures a cycle length of 80 ms and the IDRX configuration configures a cycle length of 240 ms, the UE may determine that there are four collisions every 960 ms, which may be above a threshold of two collisions every 960 ms.

The UE may start to decrement the countdown timer based on a lapse of time. For example, a countdown timer may be 1000 ms. If a TA command or a DL or UL grant is received from the network at 612, the UE may reset the collision counter and stop and reset the countdown timer, and may re-identify the collision at another time. If a TA command or a DL or UL grant is not received from the network at 612, the UE may continue to decrement the countdown timer if the countdown timer is not 0 at 616 and continue to monitor for a TA command or a DL or UL grant from the network. After the countdown timer reaches 0, the UE may initiate a local RRC release and notify upper layers of the UE, such as by transmitting an RRC release request to the upper layers. After performing the RRC release, the UE may send a synchronization message, such as a RRC message, NAS message, a TAU, or other messages, to the network to synchronize with the network. At 620, the UE may reset the collision counter and reset the countdown timer. By sending the synchronization message to the network, the UE may synchronize its RRC state with the network. Because the UE is synchronized with the network, the UE may not miss call notifications from the network that are due to an RRC mismatch between the UE and the network. Further, the UE may save power by performing an RRC release on a SIM that may not receive communications due to collisions.

Figure 7:
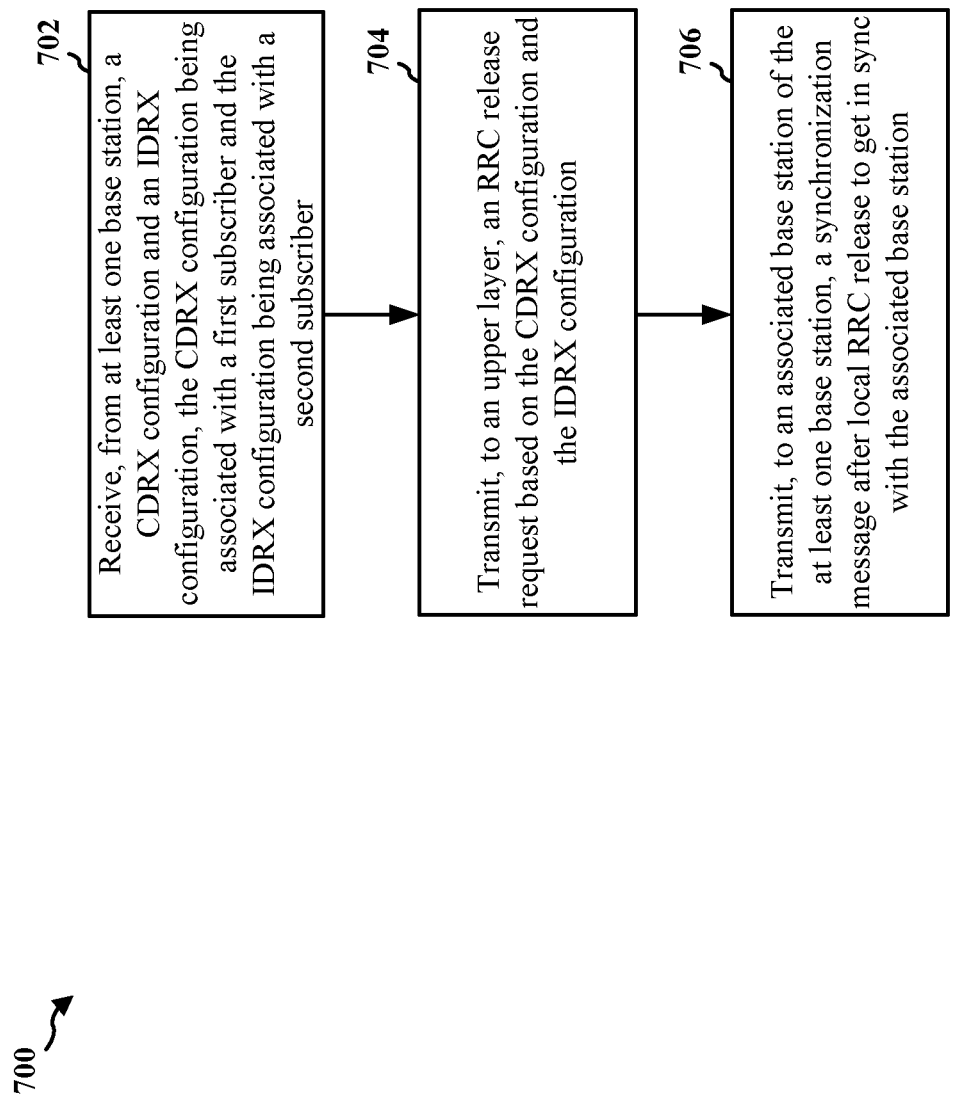
FIG. 7 is a flowchart of a method of wireless communication.

FIG. 7 is a flowchart 700 of a method of wireless communication. The method may be performed by a UE (e.g., the UE 104, the UE 502; the apparatus 902).

At 702, the UE may receive, from at least one base station, a CDRX configuration and an IDRX configuration. The CDRX configuration may be associated with a first subscriber and the IDRX configuration may be associated with a second subscriber. For example, the UE 502 may receive, from at least one base station (e.g., base station 504A/504B), a CDRX configuration 506 and an IDRX configuration 508. In some aspects, 702 may be performed by DSDS component 942 in FIG. 9.

At 704, the UE may transmit, to an upper layer, an RRC release request based on the CDRX configuration and the IDRX configuration. For example, the UE 502 may transmit, to an upper layer, an RRC release request based on the CDRX configuration and the IDRX configuration while performing the RRC release at 514. In some aspects, 704 may be performed by RRC release component 946 in FIG. 9.

At 706, the UE may transmit, to an associated base station of the at least one base station, a synchronization message (e.g., after local RRC release associated with the RRC release request) to get in synchronization with the associated base station. For example, the UE 502 may transmit, to an associated base station (e.g., base station 504A/504B) of the at least one base station, a synchronization message (e.g., 516). In some aspects, 706 may be performed by notification component 948 in FIG. 9. In some aspects, the associated base station may be the base station that transmitted the CDRX configuration. In some aspects, the associated base station may be the base station that transmitted the IDRX configuration.

Figure 8:
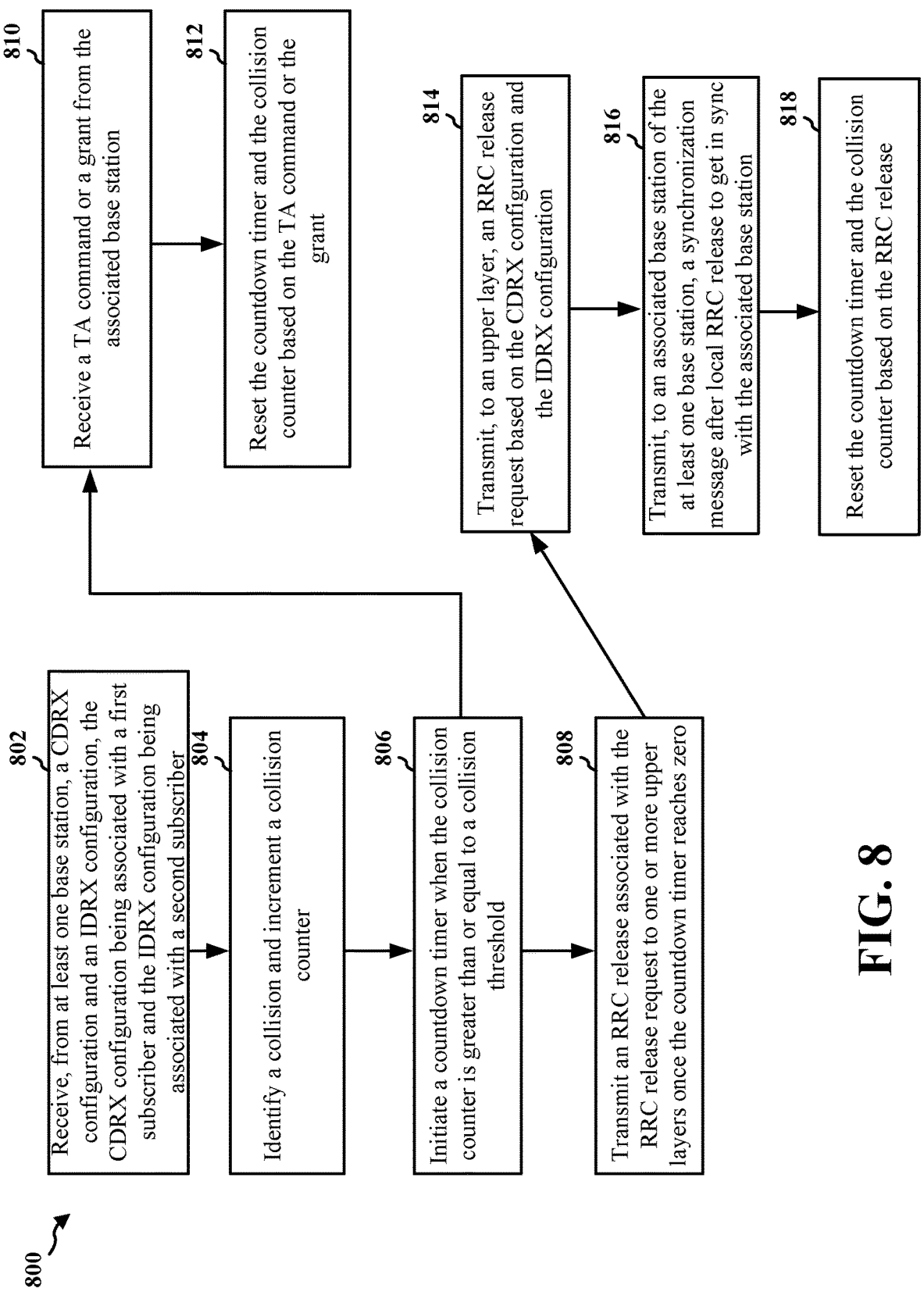
FIG. 8 is a flowchart of a method of wireless communication.

FIG. 8 is a flowchart 800 of a method of wireless communication. The method may be performed by a UE (e.g., the UE 104, the UE 502; the apparatus 902).

At 802, the UE may receive, from at least one base station, a CDRX configuration and an IDRX configuration. The CDRX configuration may be associated with a first subscriber and the IDRX configuration may be associated with a second subscriber. For example, the UE 502 may receive, from at least one base station (e.g., base station 504A/504B), a CDRX configuration 506 and an IDRX configuration 508. In some aspects, 802 may be performed by DSDS component 942 in FIG. 9. In some aspects, the first subscriber may be associated with a first SIM and the second subscriber is associated with a second SIM. In some aspects, the first subscriber may be associated with a first network operator and the second subscriber may be associated with the first network operator or a second network operator.

At 804, the UE may identify a collision and increment a collision counter. In some aspects, the UE may identify, based on a first cycle length associated with the IDRX configuration and a second cycle length associated with the CDRX configuration, a common multiple associated with the first cycle length and the second cycle length. In some aspects, the UE 502 may identify a collision between a paging message associated with the IDRX configuration and an ON duration associated with the CDRX configuration and increment a collision counter based on the identified collision at 510. For example, the UE 502 may identify a collision based on the IDRX configuration 508 and the CDRX configuration 506. In some aspects, 804 may be performed by collision identification component 944 in FIG. 9.

At 806, the UE may initiate a countdown timer when the collision counter is greater than or equal to a collision threshold. For example, the UE described in connection with FIG. 6 may initiate a countdown timer when the collision counter is greater than or equal to a collision threshold at 610. In some aspects, 806 may be performed by collision identification component 944 in FIG. 9. In some aspects, a duration of the countdown timer may be based on a first cycle length associated with the IDRX configuration and a second cycle length associated with the CDRX configuration.

In some aspects, at 808, the UE may transmit an RRC release associated with the RRC release request to one or more upper layers once the countdown timer reaches zero. For example, the UE described in connection with FIG. 6 may transmit an RRC release associated with the RRC release request to one or more upper layers once the countdown timer reaches zero at 618. In some aspects, 808 may be performed by RRC release component 946 in FIG. 9.

In some aspects, at 810, the UE may receive a TA command or a grant from the associated base station. For example, the UE 502 may receive a TA command or a grant 512 from the associated base station (e.g., the base station 604A/604B). In some aspects, 810 may be performed by collision identification component 944 in FIG. 9.

At 812, the UE may reset the countdown timer and the collision counter based on the TA command or the grant. For example, the UE described in connection with FIG. 6 may reset the countdown timer and the collision counter based on the TA command or the grant at 614. In some aspects, 812 may be performed by collision identification component 944 in FIG. 9.

At 814, the UE may transmit, to an upper layer, an RRC release request based on the CDRX configuration and the IDRX configuration. For example, the UE 502 may transmit, to an upper layer, an RRC release request based on the CDRX configuration and the IDRX configuration while performing the RRC release at 514. In some aspects, 814 may be performed by RRC release component 946 in FIG. 9. In some aspects, the RRC release request may be further based on the common multiple.

At 816, the UE may transmit, to an associated base station of the at least one base station, a synchronization message (e.g., after local RRC release associated with the RRC release request) to get in synchronization with the associated base station. For example, the UE 502 may transmit, to an associated base station (e.g., base station 504A/504B) of the at least one base station, a synchronization message (e.g., 516) to get in synchronization with the associated base station. In some aspects, 816 may be performed by notification component 948 in FIG. 9. In some aspects, the associated base station may be the base station that transmitted the CDRX configuration. In some aspects, the associated base station may be the base station that transmitted the IDRX configuration.

At 818, the UE may reset the countdown timer and the collision counter based on the RRC release. For example, the UE described in connection with FIG. 6 may reset the countdown timer and the collision counter based on the RRC release at 620. In some aspects, 818 may be performed by RRC release component 946 in FIG. 9.

Figure 9:
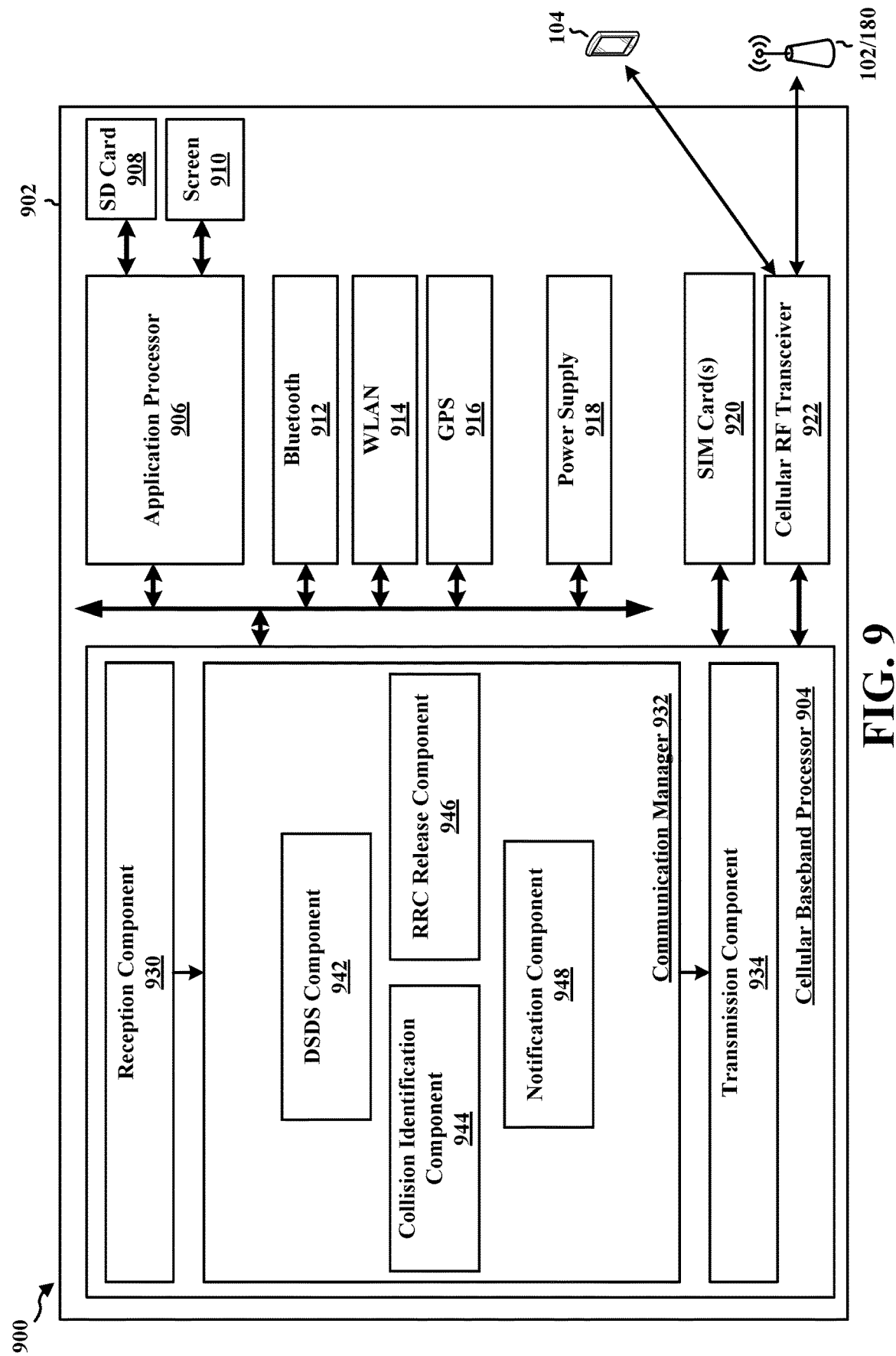
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 may include a DSDS component 942 that is configured to receive, from at least one base station, a CDRX configuration and an IDRX configuration, e.g., as described in connection with 702 in FIG. 7, or 802 in FIG. 8. The communication manager 932 may further include a collision identification component 944 that may be configured to identify, based on a first cycle length associated with the IDRX configuration and a second cycle length associated with the CDRX configuration, a common multiple associated with the first cycle length and the second cycle length or identify a collision between a paging message associated with the IDRX configuration and an ON duration associated with the CDRX configuration, and increment a collision counter based on the identified collision, e.g., as described in connection with 804 in FIG. 8. In some aspects, the collision identification component 944 may be further configured to initiate a countdown timer when the collision counter is greater than or equal to a collision threshold, e.g., as described in connection with 806 in FIG. 8. In some aspects, the collision identification component 944 may be further configured to receive a TA command or a grant from the associated base station, e.g., as described in connection with 810 in FIG. 8. In some aspects, the collision identification component 944 may be further configured to reset the countdown timer and the collision counter based on the TA command or the grant, e.g., as described in connection with 812 in FIG. 8. In some aspects, the collision identification component 944 may be further configured to reset the countdown timer and the collision counter based on the RRC release, e.g., as described in connection with 818 in FIG. 8.

The communication manager 932 may further include an RRC release component 946 that may be configured to transmit, to an upper layer, an RRC release request based on the CDRX configuration and the IDRX configuration, e.g., as described in connection with 704 in FIG. 7, or 816 in FIG. 8. The RRC release component 946 may be further configured to transmit an RRC release associated with the RRC release request to one or more upper layers once the countdown timer reaches zero, e.g., as described in connection with 808 in FIG. 8. The communication manager 932 may further include a notification component 948 that may be configured to transmit, to an associated base station of the at least one base station, a synchronization message to get in synchronization with the associated base station, e.g., as described in connection with 706 in FIG. 7, or 816 in FIG. 8.

The apparatus may include additional components that perform each of the blocks of the algorithm in the flowcharts of FIGS. 7-8. As such, each block in the flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, may include means for receiving, from at least one base station, a CDRX configuration and an IDRX configuration, the CDRX configuration being associated with a first subscriber and the IDRX configuration being associated with a second subscriber. The cellular baseband processor 904 may further include means for transmitting, to an upper layer, an RRC release request based on the CDRX configuration and the IDRX configuration. The cellular baseband processor 904 may further include means for transmitting, to an associated base station of the at least one base station, a synchronization message to get in synchronization with the associated base station. The cellular baseband processor 904 may further include means for identifying, based on a first cycle length associated with the IDRX configuration and a second cycle length associated with the CDRX configuration, a common multiple associated with the first cycle length and the second cycle length. The cellular baseband processor 904 may further include means for identifying a collision between a paging message associated with the IDRX configuration and an ON duration associated with the CDRX configuration. The cellular baseband processor 904 may further include means for incrementing a collision counter based on the identified collision. The cellular baseband processor 904 may further include means for initiating a countdown timer when the collision counter is greater than or equal to a collision threshold. The cellular baseband processor 904 may further include means for performing an RRC release associated with the RRC release request once the countdown timer reaches zero. The cellular baseband processor 904 may further include means for resetting the countdown timer and the collision counter based on a TA command or a grant received from the associated base station. The cellular baseband processor 904 may further include means for receiving a TA command or a grant from the associated base station. The cellular baseband processor 904 may further include means for resetting the countdown timer and the collision counter based on the TA command or the grant. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from at least one base station, a CDRX configuration and an IDRX configuration, the CDRX configuration being associated with a first subscriber and the IDRX configuration being associated with a second subscriber; transmit, to an upper layer, a RRC release request based on the CDRX configuration and the IDRX configuration; and transmit, to an associated base station of the at least one base station, a synchronization message to get in synchronization with the associated base station.

Aspect 2 is the apparatus of aspect 1, wherein the at least one processor coupled to the memory is further configured to: identify, based on a first cycle length associated with the IDRX configuration and a second cycle length associated with the CDRX configuration, a common multiple associated with the first cycle length and the second cycle length; wherein the RRC release request is further based on the common multiple.

Aspect 3 is the apparatus of any of aspects 1-2, wherein the at least one processor coupled to the memory is further configured to: identify a collision between a paging message associated with the IDRX configuration and an ON duration associated with the CDRX configuration; and increment a collision counter based on the identified collision.

Aspect 4 is the apparatus of any of aspects 1-3, wherein the at least one processor coupled to the memory is further configured to: initiate a countdown timer when the collision counter is greater than or equal to a collision threshold; and transmit an RRC release associated with the RRC release request to one or more upper layers once the countdown timer reaches zero.

Aspect 5 is the apparatus of any of aspects 1-4, wherein a duration of the countdown timer is based on a first cycle length associated with the IDRX configuration and a second cycle length associated with the CDRX configuration.

Aspect 6 is the apparatus of any of aspects 1-5, wherein the at least one processor coupled to the memory is further configured to: receive a TA command or a grant from the associated base station; and reset the countdown timer and the collision counter based on the TA command or the grant.

Aspect 7 is the apparatus of any of aspects 1-6, wherein the at least one processor coupled to the memory is further configured to: receive, from the associated base station, an RRC connection release; reset the countdown timer and the collision counter based on the RRC connection release.

Aspect 8 is the apparatus of any of aspects 1-7, wherein the first subscriber is associated with a first SIM and the second subscriber is associated with a second SIM.

Aspect 9 is the apparatus of any of aspects 1-8, wherein the first subscriber is associated with a first network operator and the second subscriber is associated with the first network operator or a second network operator.

Aspect 10 is the apparatus of any of aspects 1-9, wherein the UE is a DSDS UE.

Aspect 11 is the apparatus of any of aspects 1-10, further comprising a transceiver or an antenna coupled to the at least one processor.

Aspect 12 is a method of wireless communication for implementing any of aspects 1 to 11.

Aspect 13 is an apparatus for wireless communication including means for implementing any of aspects 1 to 11.

Aspect 14 is a computer-readable medium storing computer executable code, where the code when executed by a processor causes the processor to implement any of aspects 1 to 11.

What is claimed is:

1. An apparatus for wireless communication at a user equipment (UE), comprising:
a memory; and
at least one processor coupled to the memory and configured to:
receive, from at least one base station, a connected mode discontinuous reception (DRX) (CDRX) configuration and an idle DRX (IDRX) configuration, the CDRX configuration being associated with a first subscriber and the IDRX configuration being associated with a second subscriber;
transmit, to an upper layer, a radio resource control (RRC) release request based on the CDRX configuration and the IDRX configuration;
identify a collision between a paging message associated with the IDRX configuration and an ON duration associated with the CDRX configuration;
increment a collision counter based on the identified collision;

initiate a countdown timer when the collision counter is greater than or equal to a collision threshold;
transmit an RRC release associated with the RRC release request to one or more upper layers once the countdown timer reaches zero; and
transmit, to an associated base station of the at least one base station, a synchronization message to get in synchronization with the associated base station.

2. The apparatus of claim 1, wherein the at least one processor coupled to the memory is further configured to:
identify, based on a first cycle length associated with the IDRX configuration and a second cycle length associated with the CDRX configuration, a common multiple associated with the first cycle length and the second cycle length;
wherein the RRC release request is further based on the common multiple.

3. The apparatus of claim 1, wherein a duration of the countdown timer is based on a first cycle length associated with the IDRX configuration and a second cycle length associated with the CDRX configuration.

4. The apparatus of claim 1, wherein the at least one processor coupled to the memory is further configured to:
receive a timing adjustment (TA) command or a grant from the associated base station; and
reset the countdown timer and the collision counter based on the TA command or the grant.

5. The apparatus of claim 1, wherein the at least one processor coupled to the memory is further configured to:
receive, from the associated base station, an RRC connection release;
reset the countdown timer and the collision counter based on the RRC connection release.

6. The apparatus of claim 1, wherein the first subscriber is associated with a first subscriber identity module (SIM) and the second subscriber is associated with a second SIM.

7. The apparatus of claim 1, wherein the first subscriber is associated with a first network operator and the second subscriber is associated with the first network operator or a second network operator.

8. The apparatus of claim 1, wherein the UE is a dual subscriber identity module (SIM) dual standby (DSDS) UE.

9. The apparatus of claim 1, further comprising a transceiver or an antenna coupled to the at least one processor.

10. A method for wireless communication at a user equipment (UE), comprising:
receiving, from at least one base station, a connected mode discontinuous reception (DRX) (CDRX) configuration and an idle DRX (IDRX) configuration, the CDRX configuration being associated with a first subscriber and the IDRX configuration being associated with a second sub scriber;
transmitting, to an upper layer, a radio resource control (RRC) release request based on the CDRX configuration and the IDRX configuration;
identifying a collision between a paging message associated with the IDRX configuration and an ON duration associated with the CDRX configuration;
incrementing a collision counter based on the identified collision;
initiating a countdown timer when the collision counter is greater than or equal to a collision threshold;
transmitting an RRC release associated with the RRC release request to one or more upper layers once the countdown timer reaches zero; and
transmitting, to an associated base station of the at least one base station, a synchronization message to get in synchronization with the associated base station.

11. The method of claim 10, further comprising:
identifying, based on a first cycle length associated with the IDRX configuration and a second cycle length associated with the CDRX configuration, a common multiple associated with the first cycle length and the second cycle length;
wherein the RRC release request is further based on the common multiple.

12. The method of claim 10, wherein a duration of the countdown timer is based on a first cycle length associated with the IDRX configuration and a second cycle length associated with the CDRX configuration.

13. The method of claim 10, further comprising:
receiving, from the associated base station, an RRC connection release;
resetting the countdown timer and the collision counter based on the RRC connection release.

14. The method of claim 10, further comprising:
receiving a timing adjustment (TA) command or a grant from the associated base station; and
resetting the countdown timer and the collision counter based on the TA command or the grant.

15. The method of claim 10, wherein the first subscriber is associated with a first subscriber identity module (SIM) and the second subscriber is associated with a second SIM.

16. The method of claim 10, wherein the first subscriber is associated with a first network operator and the second subscriber is associated with the first network operator or a second network operator.

17. The method of claim 10, wherein the UE is a dual subscriber identity module (SIM) dual standby (DSDS) UE.

18. An apparatus for wireless communication at a user equipment (UE), comprising:
means for receiving, from at least one base station, a connected mode discontinuous reception (DRX) (CDRX) configuration and an idle DRX (IDRX) configuration, the CDRX configuration being associated with a first subscriber and the IDRX configuration being associated with a second subscriber;
means for transmitting, to an upper layer, a radio resource control (RRC) release request based on the CDRX configuration and the IDRX configuration;
means for identifying a collision between a paging message associated with the IDRX configuration and an ON duration associated with the CDRX configuration;
means for incrementing a collision counter based on the identified collision;
means for initiating a countdown timer when the collision counter is greater than or equal to a collision threshold;
means for transmitting an RRC release associated with the RRC release request to one or more upper layers once the countdown timer reaches zero; and
means for transmitting, to an associated base station of the at least one base station, a synchronization message to get in synchronization with the associated base station.

19. The apparatus of claim 18, further comprising:
means for identifying, based on a first cycle length associated with the IDRX configuration and a second cycle length associated with the CDRX configuration, a common multiple associated with the first cycle length and the second cycle length;
wherein the RRC release request is further based on the common multiple.

20. The apparatus of claim 18, wherein a duration of the countdown timer is based on a first cycle length associated with the IDRX configuration and a second cycle length associated with the CDRX configuration.

21. The apparatus of claim 18, further comprising:
means for resetting the countdown timer and the collision counter based on a timing adjustment (TA) command or a grant received from the associated base station.

22. The apparatus of claim 18, further comprising:
means for receiving a timing adjustment (TA) command or a grant from the associated base station; and
means for resetting the countdown timer and the collision counter based on the TA command or the grant.

23. The apparatus of claim 18, wherein the first subscriber is associated with a first subscriber identity module (SIM) and the second subscriber is associated with a second SIM.

24. A non-transitory computer-readable medium storing computer executable code at a user equipment (UE), the code when executed by a processor causes the processor to:
receive, from at least one base station, a connected mode discontinuous reception (DRX) (CDRX) configuration and an idle DRX (IDRX) configuration, the CDRX configuration being associated with a first subscriber and the IDRX configuration being associated with a second sub scriber;
transmit, to an upper layer, a radio resource control (RRC) release request based on the CDRX configuration and the IDRX configuration; identify a collision between a paging message associated with the IDRX configuration and an ON duration associated with the CDRX configuration;
increment a collision counter based on the identified collision;
initiate a countdown timer when the collision counter is greater than or equal to a collision threshold;
transmit an RRC release associated with the RRC release request to one or more upper layers once the countdown timer reaches zero; and
transmit, to an associated base station of the at least one base station, a synchronization message to get in synchronization with the associated base station.

25. The apparatus of claim 18, wherein the first subscriber is associated with a first network operator and the second subscriber is associated with the first network operator or a second network operator.

26. The apparatus of claim 18, wherein the UE is a dual subscriber identity module (SIM) dual standby (DSDS) UE.

* * * * *